United States Patent
Kosugi et al.

(10) Patent No.: US 10,906,534 B2
(45) Date of Patent: Feb. 2, 2021

(54) AUTOMATIC STOP DEVICE AND AUTOMATIC STOP METHOD

(71) Applicant: Panasonic Intellectual Property Management Co., Ltd., Osaka (JP)

(72) Inventors: Masanori Kosugi, Kanagawa (JP); Takashi Miura, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 337 days.

(21) Appl. No.: 15/756,910

(22) PCT Filed: Jun. 13, 2016

(86) PCT No.: PCT/JP2016/002832
§ 371 (c)(1),
(2) Date: Mar. 1, 2018

(87) PCT Pub. No.: WO2017/042994
PCT Pub. Date: Mar. 16, 2017

(65) Prior Publication Data
US 2018/0251127 A1 Sep. 6, 2018

(30) Foreign Application Priority Data

Sep. 10, 2015 (JP) .................. 2015-178571

(51) Int. Cl.
*B60W 30/09* (2012.01)
*B60R 21/00* (2006.01)
(Continued)

(52) U.S. Cl.
CPC ............. *B60W 30/09* (2013.01); *B60R 21/00* (2013.01); *B60T 7/12* (2013.01); *B60W 40/04* (2013.01);
(Continued)

(58) Field of Classification Search
CPC .... B60W 30/09; B60W 40/105; B60W 40/04; B60W 2554/801; B60W 2554/804;
(Continued)

(56) References Cited

U.S. PATENT DOCUMENTS 6,591,180 B1 7/2003 Steiner
8,126,642 B2 * 2/2012 Trepagnier .......... G05D 1/0214
701/423

(Continued)

FOREIGN PATENT DOCUMENTS

JP 2000-118368 A 4/2000
JP 2001-113979 A 4/2001
(Continued)

*Primary Examiner* — Jaime Figueroa
(74) *Attorney, Agent, or Firm* — Seed IP Law Group LLP

(57) ABSTRACT

The present disclosure provides an automatic stop device and an automatic stop method that enable an autonomous-driving traveling object to automatically stop. Automatic stop device automatically stops a vehicle in response to urgent information requiring urgency. Automatic stop device includes: urgent information receiver configured to receive the urgent information; urgency determiner configured to determine a degree of urgency about the urgent information by choosing from a plurality of levels in accordance with the urgent information; surrounding information acquisition unit configured to acquire information about a situation surrounding the vehicle; and stop time determiner configured to determine a time taken to automatically stop the vehicle. The time is determined in accordance with the degree of the urgency and the information about the situation surrounding the vehicle. Automatic stop device further includes automatic stop unit configured to automatically stop the vehicle upon a lapse of the determined time.

7 Claims, 3 Drawing Sheets

(51) Int. Cl.
*B60T 7/12* (2006.01)
*G08G 1/0965* (2006.01)
*G08G 1/16* (2006.01)
*B60W 40/04* (2006.01)
*B60W 40/105* (2012.01)
*G08B 27/00* (2006.01)

(52) U.S. Cl.
CPC ......... *B60W 40/105* (2013.01); *G08G 1/0965* (2013.01); *G08G 1/163* (2013.01); *G08G 1/164* (2013.01); *G08G 1/166* (2013.01); *B60W 2554/801* (2020.02); *B60W 2554/804* (2020.02); *B60W 2556/45* (2020.02); *G08B 27/006* (2013.01)

(58) Field of Classification Search
CPC ...... B60W 2556/45; B60R 21/00; B60T 7/12; G08G 1/0965; G08G 1/163; G08G 1/164; G08G 1/166; G08B 27/006
USPC ..................................................... 701/1, 301
See application file for complete search history.

(56) References Cited

U.S. PATENT DOCUMENTS

| | | | | |
|---|---|---|---|---|
| 9,473,983 B1* | 10/2016 | Gerdes | .................... | H04L 27/00 |
| 9,646,428 B1* | 5/2017 | Konrardy | ........... | G08G 1/096741 |
| 10,185,998 B1* | 1/2019 | Konrardy | ............... | G06Q 40/08 |
| 2002/0115423 A1* | 8/2002 | Hatae | ...................... | G08B 25/08 |
| | | | | 455/404.1 |
| 2005/0267671 A1* | 12/2005 | Matsumoto | ............ | B60Q 9/008 |
| | | | | 701/117 |
| 2007/0150134 A1* | 6/2007 | Yamamoto | ............ | G08G 1/162 |
| | | | | 701/29.5 |
| 2007/0198145 A1* | 8/2007 | Norris | ........................ | B60T 7/22 |
| | | | | 701/23 |
| 2008/0294690 A1* | 11/2008 | McClellan | ....... | G08G 1/096725 |
| 2009/0048750 A1* | 2/2009 | Breed | .................... | G08G 1/161 |
| | | | | 701/70 |
| 2009/0051510 A1* | 2/2009 | Follmer | ............... | G07C 5/0808 |
| | | | | 340/425.5 |
| 2010/0106356 A1* | 4/2010 | Trepagnier | ........... | G05D 1/0248 |
| | | | | 701/25 |
| 2010/0256852 A1* | 10/2010 | Mudalige | ............... | G08G 1/163 |
| | | | | 701/24 |
| 2011/0238292 A1* | 9/2011 | Bresnahan | ......... | G01C 21/3407 |
| | | | | 701/533 |
| 2011/0298636 A1* | 12/2011 | Sekiguchi | .......... | G08G 1/09675 |
| | | | | 340/905 |
| 2012/0253821 A1* | 10/2012 | Kamiya | .................. | G10L 99/00 |
| | | | | 704/270.1 |
| 2013/0289798 A1* | 10/2013 | Lee | ......... | G06F 17/00 |
| | | | | 701/1 |
| 2014/0067220 A1* | 3/2014 | Seiler | ........................ | B60T 7/12 |
| | | | | 701/70 |
| 2014/0136414 A1* | 5/2014 | Abhyanker | ............ | G06Q 50/28 |
| | | | | 705/44 |
| 2014/0244096 A1* | 8/2014 | An | ...................... | G05D 1/0055 |
| | | | | 701/25 |
| 2014/0309812 A1* | 10/2014 | Lee | ......... | H04L 67/12 |
| | | | | 701/2 |
| 2014/0350836 A1* | 11/2014 | Stettner | ................. | G01S 17/931 |
| | | | | 701/301 |
| 2015/0012166 A1* | 1/2015 | Hauler | ................ | G05D 1/0077 |
| | | | | 701/23 |
| 2015/0025708 A1* | 1/2015 | Anderson | ............ | A61B 5/6804 |
| | | | | 701/2 |
| 2015/0197248 A1* | 7/2015 | Breed | .................... | G08G 1/167 |
| | | | | 701/93 |
| 2015/0331422 A1* | 11/2015 | Hartung | ................. | G05D 1/021 |
| | | | | 701/23 |
| 2016/0007166 A1* | 1/2016 | Iwai | ........................ | H04W 4/06 |
| | | | | 370/312 |
| 2016/0137198 A1* | 5/2016 | Hauler | .................. | B60W 30/08 |
| | | | | 701/48 |
| 2016/0231746 A1* | 8/2016 | Hazelton | ............... | G01S 13/867 |
| 2016/0234656 A1* | 8/2016 | Iwai | ........................ | H04W 12/06 |
| 2016/0252905 A1* | 9/2016 | Tian | ..................... | B60W 30/00 |
| | | | | 701/23 |
| 2016/0368491 A1* | 12/2016 | Hauler | ...................... | B60T 7/22 |
| 2017/0011129 A1* | 1/2017 | Matsumoto | ........... | G06F 40/194 |
| 2017/0023945 A1* | 1/2017 | Cavalcanti | ............... | G08G 1/04 |
| 2018/0178766 A1* | 6/2018 | Oba | ...................... | B60W 50/10 |

FOREIGN PATENT DOCUMENTS

| | | |
|---|---|---|
| JP | 2001-143197 A | 5/2001 |
| JP | 2002-130000 A | 5/2002 |
| JP | 2002-347546 A | 12/2002 |
| JP | 2007-010528 A | 1/2007 |
| JP | 2007-168727 A | 7/2007 |
| JP | 2008-181200 A | 8/2008 |
| JP | 2008-296783 A | 12/2008 |
| JP | 2014-109948 A | 6/2014 |
| JP | 2015-010887 A | 1/2015 |

* cited by examiner

FIG. 2A

| URGENCY A | L≤40m | 40m<L≤100m | 100m<L |
|---|---|---|---|
| V≤40km/h | T1 | T1 | T1 |
| 40km/h<V≤60km/h | T2 | T1 | T1 |
| 60km/h<V | T3 | T2 | T1 |

FIG. 2B

| URGENCY B | L≤40m | 40m<L≤100m | 100m<L |
|---|---|---|---|
| V≤40km/h | T2 | T1 | T1 |
| 40km/h<V≤60km/h | T3 | T2 | T1 |
| 60km/h<V | T3 | T3 | T2 |

FIG. 2C

| URGENCY C | L≤40m | 40m<L≤100m | 100m<L |
|---|---|---|---|
| V≤40km/h | T3 | T2 | T2 |
| 40km/h<V≤60km/h | T3 | T3 | T2 |
| 60km/h<V | T3 | T3 | T3 |

AUTOMATIC STOP DEVICE AND AUTOMATIC STOP METHOD

This application is a U.S. national stage application of the PCT International Application No. PCT/JP2016/002832 filed on Jun. 13, 2016, which claims the benefit of foreign priority of Japanese patent application No. 2015-178571 filed on Sep. 10, 2015, the contents all of which are incorporated herein by reference.

TECHNICAL FIELD

The present disclosure relates to an automatic stop device and an automatic stop method for automatically stopping a vehicle or any other traveling object.

BACKGROUND ART

A technology that is widely adopted for vehicles and other traveling objects enables acquisition of information requiring urgency and notification of that information to the driver. However, if information with a not so high degree of urgency is presented to the driver during driving, that information can possibly distract the attention of the driver and compromise the safety of the driver. Thus, it is presumed that information only with a high degree of urgency be presented.

Accordingly PTL 1, for example, discloses an information transmission device that receives, from the outside, information with importance level attached to which a level of importance chosen from plurality of levels and a level of margin in driver's driving chosen from plurality of levels. The information transmission device restricts transmission of the information with importance level to the driver depending on the level of margin in driving and the level of importance attached to the information with importance level.

CITATION LIST

Patent Literature

PTL 1: Unexamined Japanese Patent Publication No. 2014-109948

SUMMARY OF THE INVENTION

Meanwhile, technologies for autonomously driving vehicles and other traveling objects are being developed. These autonomous driving technologies for traveling objects are required to enable the traveling object to automatically stop in response to information with a very high degree of urgency, such as urgent disaster reports, for example.

However, if a vehicle automatically stops immediately after acquisition of information with a high degree of urgency, the safety of the vehicle may be compromised. For example, if the vehicle is followed by another vehicle and the vehicle behind is not an autonomous vehicle, a sudden automatic stop of the vehicle can possibly cause the vehicle to be struck by the vehicle behind due to a delayed response by a driver of the vehicle behind.

Because of this, there is demand for a technology that enables autonomous-driving traveling objects to automatically stop in accordance with surrounding situations.

It is an object of the present disclosure to provide an automatic stop device and an automatic stop method that enable an autonomous-driving traveling object to automatically stop in accordance with a situation surrounding the traveling object.

An automatic stop device according to the present disclosure automatically stops a traveling object in response to urgent information requiring urgency. The automatic stop device includes: an urgent information receiver configured to receive the urgent information; an urgency determiner configured to determine a degree of urgency about the urgent information chosen from a plurality of levels in accordance with the urgent information; a surrounding information acquisition unit configured to acquire information about a situation surrounding the traveling object; and a stop time determiner configured to determine a time taken to automatically stop the traveling object. The time is determined in accordance with the degree of the urgency and the information about the situation surrounding the traveling object. The automatic stop device further includes an automatic stop unit configured to automatically stop the traveling object upon a lapse of the determined time.

An automatic stop method according to the present disclosure is a method of automatically stopping a traveling object in response to urgent information requiring urgency. The method includes: acquiring information about a situation surrounding the traveling object; receiving the urgent information; determining a degree of urgency about the urgent information chosen from a plurality of levels in accordance with the urgent information; and determining a time taken to automatically stop the traveling object. The time is determined in accordance with the degree of the urgency and the information about the situation surrounding the traveling object. The method further includes automatically stopping the traveling object upon a lapse of the determined time.

The present disclosure enables an autonomous-driving traveling object to automatically stop in accordance with a situation surrounding the traveling object.

BRIEF DESCRIPTION OF DRAWINGS

FIG. 2A is an example of a criteria table used for determination of a stop time by a stop time determiner.

FIG. 2B is an example of a criteria table used for determination of a stop time by the stop time determiner.

FIG. 2C is an example of a criteria table used for determination of a stop time by the stop time determiner.

DESCRIPTION OF EMBODIMENT

Hereinafter, an exemplary embodiment of the present disclosure will be described in detail. The exemplary embodiment of the present disclosure takes a vehicle as an example of a traveling object. However, the scope of the present disclosure should not be limited to this exemplary embodiment. The present disclosure can be applied to other traveling objects to which autonomous driving technology can be adopted, such as small unmanned aerial vehicles called drones and robots that travel by wheel, caterpillar (crawler), leg, or other means.

Figure 1:
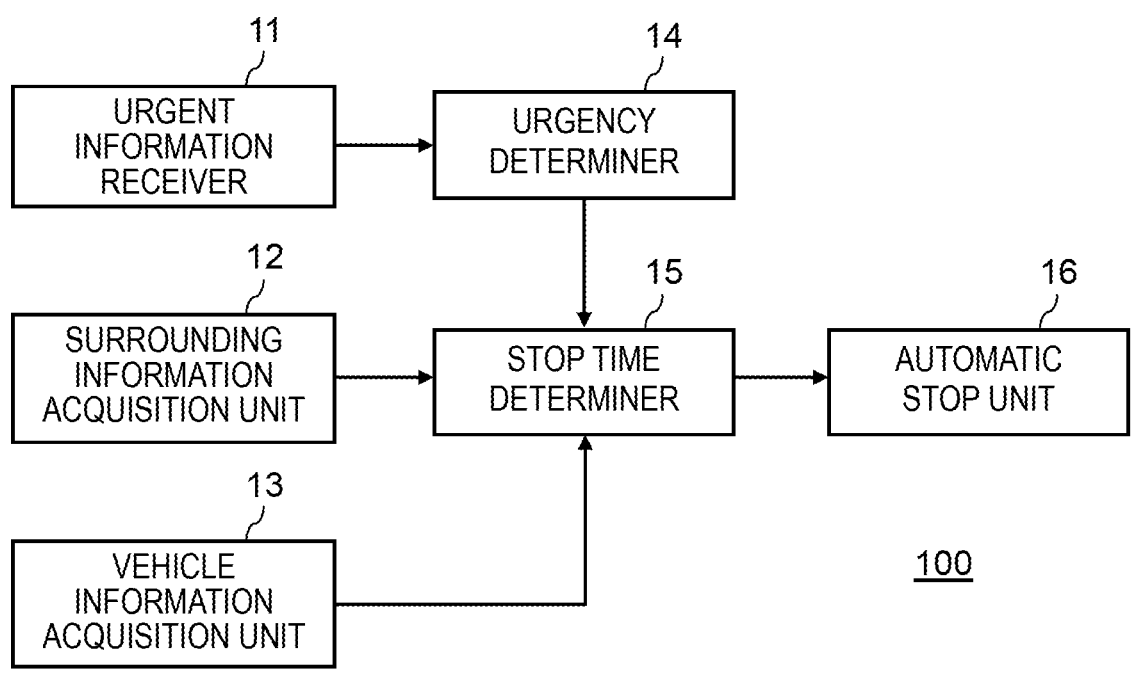
FIG. 1 is a drawing illustrating an example configuration of an automatic stop device according to an exemplary embodiment.

FIG. 1 is a drawing illustrating an example configuration of automatic stop device 100 according to the exemplary embodiment. Automatic stop device 100 is a device that is provided in a vehicle and used to automatically stop the vehicle in response to information acquired from an information distribution apparatus (not shown).

With reference to FIG. 1, automatic stop device 100 includes urgent information receiver 11, surrounding information acquisition unit 12, vehicle information acquisition unit 13, urgency determiner 14, stop time determiner 15, and automatic stop unit 16.

Urgent information receiver 11 receives information distributed from an information distribution apparatus (not shown). Examples of the information distribution apparatus include base stations for mobile telecommunications networks. The information distribution apparatus distributes information requiring urgency by wireless communication or any other method. The information requiring urgency is information that the driver of a vehicle is required to handle with some degree of urgency, such as an urgent disaster report issued by an earthquake tsunami warning system (ETWS) or any similar system and information about an approaching urgent vehicle. Upon receiving information requiring urgency from an information distribution apparatus, urgent information receiver 11 outputs the received information to urgency determiner 14.

Surrounding information acquisition unit 12 acquires information about a situation surrounding the vehicle of a driver. Examples of surrounding information acquisition unit 12 include millimeter wave radar, global positioning system (GPS) receivers, and cameras equipped with image analysis means. Millimeter wave radar detects the distance from the vehicle to an object surrounding the vehicle and a velocity of the object relative to the vehicle, for example. A GPS receiver acquires information about a position of the vehicle. Information about the vehicle position acquired by the GPS receiver can be verified against map information to acquire information about the situation surrounding the vehicle to some extent. A camera takes an image of a scene around the vehicle and generates the taken image. The automatic stop device can analyze the image taken by the camera and thereby acquire information about a location of an object around the vehicle and a distance between the object and the vehicle.

Surrounding information acquisition unit 12 may have a communication unit (not shown) for vehicle-to-vehicle communication and vehicle-to-infrastructure communication, for example and acquire information about the situation surrounding the vehicle through the communication unit. The vehicle-to-vehicle communication and the vehicle-to-infrastructure communication enable the acquisition of information about a position and a velocity of another vehicle around the vehicle, for example. Surrounding information acquisition unit 12 outputs information acquired in this way about the situation surrounding the vehicle to stop time determiner 15.

Vehicle information acquisition unit 13 acquires information about a state of the vehicle. Examples of vehicle information acquisition unit 13 include velocity sensors and gyro sensors. A velocity sensor acquires information about velocity of the vehicle, for example. A gyro sensor acquires information about an attitude angle of the vehicle. Vehicle information acquisition unit 13 outputs information acquired in this way about the state of the vehicle to stop time determiner 15. Vehicle information acquisition unit 13 is an example of a traveling object information acquisition unit according to the present disclosure.

In response to information requiring urgency sent from urgent information receiver 11, urgency determiner 14 determines a degree of urgency about that information. Specifically, if information requiring urgency is information about disaster, such as an urgent earthquake report or a prompt report on a tsunami, for example, urgency determiner 14 gives urgency A (a maximum degree of urgency) to that information because of the necessity for a swiftest action such as immediately stopping the vehicle. If information requiring urgency pertains to an approaching urgent vehicle, such as an ambulance, a fire engine, or a police vehicle, for example, urgency determiner 14 gives urgency B (a lower degree of urgency than urgency A) to that information because of the necessity for stopping the vehicle in line with the approach of the urgent vehicle despite no need for a prompt stop. If information requiring urgency is information about traffic congestion, for example, urgency determiner 14 gives urgency C (a lower degree of urgency than urgency B) to that information because of the necessity for an action according to the situation surrounding the vehicle despite no need for a prompt stop. Information requiring urgency described above is an example and should not be construed to limit the scope of the present disclosure.

Urgency determiner 14 determines a degree of urgency by going through a process described below, for example. For example, to information requiring urgency, a flag indicating any one of urgencies A to C according to the contained matter is attached in advance. Urgency determiner 14 determines a degree of urgency in reference to the flag. Alternatively, if no flag indicating urgency is attached in advance to information requiring urgency, urgency determiner 14 may refer to the contents of the information and determine a degree of urgency according to the contents. Urgency determiner 14 outputs a result determined in this way to stop time determiner 15.

Stop time determiner 15 receives information about the situation surrounding the vehicle from surrounding information acquisition unit 12, information about the state of the vehicle from vehicle information acquisition unit 13, and a result of the determined degree of urgency from urgency determiner 14. In accordance with these received data, stop time determiner 15 determines a stop time, i.e. a time that the automatic stop device takes to automatically bring the vehicle to a full stop.

Hereinafter, with proviso that the vehicle is followed by another vehicle, information about the situation surrounding the vehicle pertains to a distance between the vehicle and the vehicle behind. Information about the state of the vehicle pertains to a velocity of the vehicle.

Stop time determiner 15 determines a stop time by going through a process described below, for example. FIGS. 2A to 2C are each an example of a criteria table used for determination of a stop time by stop time determiner 15. FIG. 2A is a criteria table for urgency A; FIG. 2B is a criteria table for urgency B; and FIG. 2C is a criteria table for urgency C, for example. In FIGS. 2A to 2C, V represents the velocity of the vehicle (km/h); and L represents the distance from the vehicle behind (m). T1, T2, and T3 each represent a time taken until an automatic stop. T1 is the shortest among the three times and denotes an immediate stop within a safe range, for example. T2 is longer than T1, whereas T3 is longer than T2.

Specifically, in urgency A, the maximum degree of urgency, as shown in FIG. 2A, stop time determiner 15 determines shortest stop time T1 if vehicle velocity V is lower than or equal to 40 km/h irrespective of distance L from the vehicle behind.

Stop time determiner 15 determines stop time T2, which is longer than T1, if vehicle velocity V is over 40 km/h and lower than or equal to 60 km/h and if distance L from the vehicle behind is shorter than or equal to 40 m. Stop time determiner 15 determines shortest stop time T1 if vehicle velocity V is over 40 km/h and lower than or equal to 60 km/h and if distance L from the vehicle behind is longer than 40 m.

Stop time determiner 15 determines stop time T3, which is longer than T2, if vehicle velocity V is over 60 km/h and if distance L from the vehicle behind is shorter than or equal to 40 m. Stop time determiner 15 determines stop time T2 if vehicle velocity V is over 60 km/h and if distance L from the vehicle behind is longer than 40 m and shorter than or equal to 100 m. Stop time determiner 15 determines stop time T1 if vehicle velocity V is over 60 km/h and if distance L from the vehicle behind is longer than 100 m.

With reference to FIG. 2B, in urgency B, a lower degree of urgency than urgency A, stop time determiner 15 determines stop time T2 if vehicle velocity V is lower than or equal to 40 km/h and if distance L from the vehicle behind is shorter than or equal to 40 m. Stop time determiner 15 determines stop time T1 if vehicle velocity V is lower than or equal to 40 km/h and if distance L from the vehicle behind is longer than 40 m.

Stop time determiner 15 determines stop time T3 if vehicle velocity V is over 40 km/h and lower than or equal to 60 km/h and if distance L from the vehicle behind is shorter than or equal to 40 m. Stop time determiner 15 determines stop time T2 if vehicle velocity V is over 40 km/h and lower than or equal to 60 km/h and if distance L from the vehicle behind is longer than 40 m and shorter than or equal to 100 m. Stop time determiner 15 determines stop time T1 if vehicle velocity V is over 40 km/h and lower than or equal to 60 km/h and if distance L from the vehicle behind is longer than 100 m.

Stop time determiner 15 determines stop time T3 if vehicle velocity V is over 60 km/h and if distance L from the vehicle behind is shorter than or equal to 100 m. Stop time determiner 15 determines stop time T2 if vehicle velocity V is over 60 km/h and if distance L from the vehicle behind is longer than 100 m.

With reference to FIG. 2C, in urgency C, a lower degree of urgency than urgency B, stop time determiner 15 determines stop time T3 if vehicle velocity V is lower than or equal to 40 km/h and if distance L from the vehicle behind is shorter than or equal to 40 m. Stop time determiner 15 determines stop time T2 if vehicle velocity V is lower than or equal to 40 km/h and if distance L from the vehicle behind is longer than 40 m.

Stop time determiner 15 determines stop time T3 if vehicle velocity V is over 40 km/h and lower than or equal to 60 km/h and if distance L from the vehicle behind is shorter than or equal to 100 m. Stop time determiner 15 determines stop time T2 if vehicle velocity V is over 40 km/h and lower than or equal to 60 km/h and if distance L from the vehicle behind is longer than 100 m.

Stop time determiner 15 determines stop time T3 if vehicle velocity V is over 60 km/h irrespective of distance L from the vehicle behind.

As described above, stop time determiner 15 determines a stop time in accordance with a plurality of conditions such as urgency, vehicle velocity V, and distance L from the vehicle behind. With reference to FIG. 2A, the stop time determined by stop time determiner 15 is set to a shorter time in line with a rise in the degree of urgency. With reference to FIGS. 2A to 2C, in an identical degree of urgency, the stop time is set to a longer time in line with an increase in vehicle velocity V and a decrease in distance L from the vehicle behind. This is presumably because of a high probability that a stop by the vehicle in a short time will cause the vehicle to be struck by the vehicle behind if vehicle velocity V is high and distance L from the vehicle behind is small.

In the criteria tables used for determination of the stop time, as illustrated in FIGS. 2A to 2C, the urgency, vehicle velocity V, distance L from the vehicle behind, and the stop time are each specified in three levels. These examples, however, should not be construed to limit the scope of the present disclosure. The number of levels for these elements may be fewer or greater than three. In particular, with reference to an example of FIGS. 2A to 2C, the stop time determiner determines any of the stop times so that the vehicle will definitely come to a stop. However, the stop time determiner may determine an infinite stop time as a longer stop time than T3 in an instance of stop time determination so that the vehicle will not come to a stop. In addition, 40 km/h and 60 km/h that divide vehicle velocity V into levels and 40 m and 100 m that divide distance L from the vehicle behind into levels are example figures. The scope of the present disclosure should not be limited to these examples.

Stop time determiner 15 may determine the stop time by using any data other than vehicle velocity V as information about the state of the vehicle. In other words, stop time determiner 15 may use data on the attitude angle of the vehicle as information about the state of the vehicle, for example. If the attitude angle of the vehicle is greater or equal to a predetermined angle, stop time determiner 15 may determine a long stop time to avoid danger involved in a short time stop. A GPS receiver may acquire data about the position of the vehicle, and stop time determiner 15 may use information obtained through verification of this data against map information as information about the state of the vehicle. If the vehicle is located at a railroad crossing, a railway track site, or any other position that prohibits a vehicle stop, for example, stop time determiner 15 may determine a long stop time or select no vehicle stop. Stop time determiner 15 determines the stop time by using information about the state of the vehicle and information about the situation surrounding the vehicle. Any of these items of information may contain a plurality of kinds of data rather than a single kind of data.

Stop time determiner 15 outputs the stop time determined in this way to automatic stop unit 16.

Automatic stop unit 16 automatically stops the vehicle. The present disclosure defines no specific configuration for automatic stop unit 16. Automatic stop unit 16 may have a conventional configuration. In accordance with a stop time output from stop time determiner 15, automatic stop unit 16 stops the vehicle upon the lapse of the stop time.

A description has been given of the example configuration of automatic stop device 100 according to the exemplary embodiment of the present disclosure. An example procedure performed by automatic stop device 100 will now be described.

Figure 3:
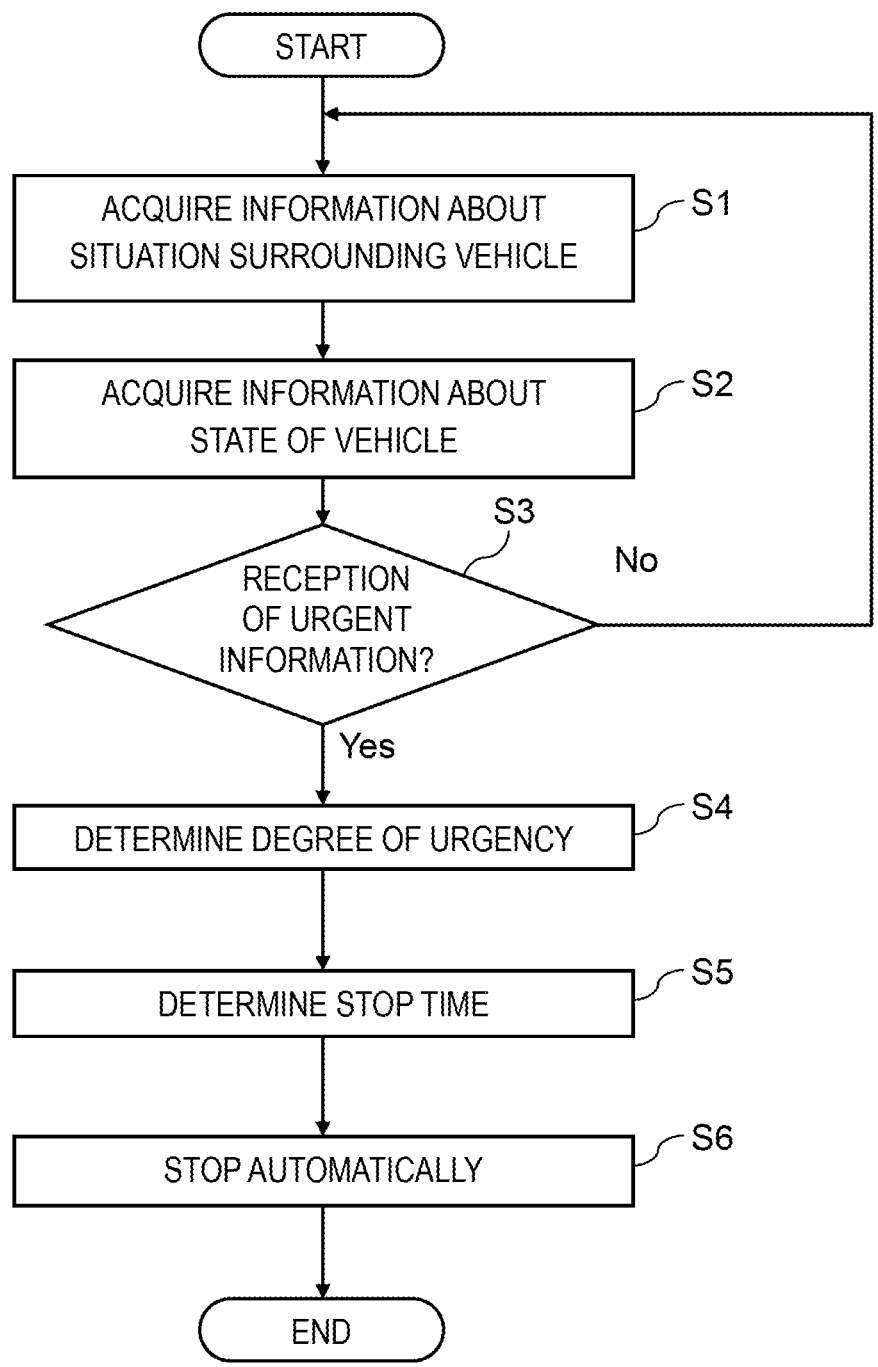
FIG. 3 is a flowchart illustrating an example procedure performed by the automatic stop device.

FIG. 3 is a flowchart illustrating the example procedure performed by automatic stop device 100. In step S1, surrounding information acquisition unit 12 acquires information about the situation surrounding the vehicle, e.g. information about the distance from the vehicle behind. In step S2, vehicle information acquisition unit 13 acquires information about the state of the vehicle, e.g. information about the velocity of the vehicle.

In the illustration given in FIG. 3, information about the situation surrounding the vehicle is acquired in step S1 and information about the state of the vehicle is acquired in step S2 for explanatory convenience. However, it is preferable that automatic stop device 100 acquire the information about the situation surrounding the vehicle and the information about the state of the vehicle at any time, e.g. in a given cycle. Thus, the sequence of steps S1 and S2 may be altered, or steps S1 and S2 may be simultaneously performed.

In step S3, the automatic stop device determines whether or not urgent information receiver 11 has received urgent information. If urgent information receiver 11 has received urgent information in step S3, the process goes to step S4. If not, the process returns to step S1.

In step S4, urgency determiner 14 determines a degree of urgency about the urgent information received by urgent information receiver 11 in step S3. In step S5, stop time determiner 15 determines a stop time in accordance with the degree of urgency determined by urgency determiner 14 in step S4, as well as the information about the situation surrounding the vehicle and the information about the state of the vehicle, which are acquired by the acquisition units in steps S1 and S2. In step S6, automatic stop unit 16 exercises control to stop the vehicle in accordance with the stop time determined in step S5.

In this way, automatic stop device 100 determines a degree of urgency in response to reception of the urgent information and determines a stop time in accordance with the determined degree of urgency, as well as the information about the situation surrounding the vehicle and the information about the state of the vehicle. Consequently, even if reception of the urgent information creates a situation in which the vehicle has to be automatically stopped, automatic stop device 100 can automatically stop the vehicle in accordance with the situation surrounding the vehicle and the state of the vehicle.

As described above, automatic stop device 100 according to the exemplary embodiment of the present disclosure automatically stops a vehicle in response to urgent information requiring urgency. Automatic stop device 100 includes: urgent information receiver 11 configured to receive the urgent information; urgency determiner 14 configured to determine a degree of urgency about the urgent information chosen from a plurality of levels in accordance with the urgent information; surrounding information acquisition unit 12 configured to acquire information about a situation surrounding the vehicle; and stop time determiner 15 configured to determine a time taken to automatically stop the vehicle. The time is determined in accordance with the degree of the urgency and the information about the situation surrounding the vehicle. Automatic stop device 100 further includes automatic stop unit 16 configured to automatically stop the vehicle upon a lapse of the determined time. This configuration allows the automatic stop device to automatically stop the vehicle or any other traveling object in accordance with the situation surrounding the vehicle or any other traveling object.

In particular, in automatic stop device 100 according to the exemplary embodiment of the present disclosure, stop time determiner 15 determines the time taken to automatically stop a vehicle such that the time taken to automatically stop the vehicle is shorter when the degree of urgency about the urgent information is at a higher level than is at a lower level. Surrounding information acquisition unit 12 acquires at least information about a distance between the vehicle and a vehicle behind as the information about the situation surrounding the vehicle. Stop time determiner 15 determines the time taken to automatically stop the vehicle such that the time taken to automatically stop the vehicle is longer when the distance between the vehicle and the vehicle behind is smaller than is larger.

This configuration means that the stop time determiner determines an increase in the time taken to automatically stop the vehicle in line with a drop in the degree of urgency about the urgent information from a high level to a low level. Thus, the automatic stop device makes no sudden automatic stop unless the urgent information receiver receives information with a high degree of urgency. In addition, the stop time determiner determines an increase in the time taken for the vehicle to come to an automatic stop following acquisition of the urgent information in line with a change in the distance between the vehicle and the vehicle behind from a long length to a short length. This configuration prevents an automatic stop by the vehicle from bringing about a situation such as the vehicle being struck by the vehicle behind.

Automatic stop device 100 according to the exemplary embodiment of the present disclosure further includes vehicle information acquisition unit 13 to acquire information about a state of the vehicle. Stop time determiner 15 determines the time taken to automatically stop the vehicle in accordance with the degree of the urgency, the information about the situation surrounding the vehicle, and the information about the state of the vehicle. Vehicle information acquisition unit 13 acquires at least information about a velocity of the vehicle as the information about the state of the vehicle. Stop time determiner 15 determines the time taken to automatically stop the vehicle such that the time taken to automatically stop the vehicle is shorter when the velocity of the vehicle is smaller than is larger.

Thus, the stop time determiner determines an increase in the time taken for the vehicle to come to an automatic stop following acquisition of the urgent information in line with a change in the velocity of the vehicle from a low rate to a high rate. This configuration prevents an automatic stop by the vehicle from causing the vehicle to be struck by the vehicle behind.

INDUSTRIAL APPLICABILITY

The present disclosure is suitable for automatic stop devices that automatically stop traveling objects such as vehicles.

REFERENCE MARKS IN THE DRAWINGS

100 automatic stop device
11 urgent information receiver
12 surrounding information acquisition unit
13 vehicle information acquisition unit
14 urgency determiner
15 stop time determiner
16 automatic stop unit

The invention claimed is:

1. An automatic stop device that automatically stops a vehicle in response to urgent information, the urgent information being information requiring urgency, the automatic stop device comprising:
   an urgent information receiver configured to receive, from an information distribution apparatus external to the vehicle, the urgent information by wireless communication;
   an urgency determiner configured to determine a degree of urgency about the urgent information chosen from a plurality of levels in accordance with the urgent information;

a surrounding information acquisition unit configured to acquire information about a situation surrounding the vehicle;

a stop time determiner configured to determine a time taken to automatically stop the vehicle, the time being determined in accordance with the degree of the urgency and the information about the situation surrounding the vehicle; and an automatic stop unit configured to automatically stop the vehicle upon a lapse of the determined time, wherein the urgent information is information selected from an urgent disaster report issued by an earthquake tsunami warning system and approaching urgent vehicle information, and wherein the stop time determiner determines a shorter time taken to automatically stop the vehicle in response to the urgent information being the urgent disaster report issued by the earthquake tsunami warning system, and determines a longer time taken to automatically stop the vehicle in response to the urgent information being the approaching urgent vehicle information.

2. The automatic stop device according to claim 1, wherein the surrounding information acquisition unit acquires at least information about a distance between the vehicle and a vehicle behind as the information about the situation surrounding the vehicle, and wherein the stop time determiner determines the time taken to automatically stop the vehicle such that the time taken to automatically stop the vehicle is longer when the distance between the vehicle and the vehicle behind is smaller than is larger.

3. The automatic stop device according to claim 2, further comprising a vehicle information acquisition unit configured to acquire information about a state of the vehicle, wherein the stop time determiner determines the time taken to automatically stop the vehicle in accordance with the degree of the urgency, the information about the situation surrounding the vehicle, and the information about the state of the vehicle.

4. The automatic stop device according to claim 3, wherein the vehicle information acquisition unit acquires at least information about a velocity of the vehicle as the information about the state of the vehicle, and wherein the stop time determiner determines the time taken to automatically stop the vehicle such that the time taken to automatically stop the vehicle is shorter when the velocity of the vehicle is smaller than is larger.

5. A method of automatically stopping a vehicle in response to urgent information, the urgent information being information requiring urgency, the method comprising:

acquiring information about a situation surrounding the vehicle;

receiving, from an information distribution apparatus external to the vehicle, the urgent information by wireless communication;

determining a degree of urgency about the urgent information chosen from a plurality of levels in accordance with the urgent information;

determining a time taken to automatically stop the vehicle, the time being determined in accordance with the degree of the urgency and the information about the situation surrounding the vehicle; and automatically stopping the vehicle upon a lapse of the determined time, wherein the urgent information is information selected from an urgent disaster report issued by an earthquake tsunami warning system and approaching urgent vehicle information, and wherein determining the time taken to automatically stop the vehicle includes determining a shorter time taken to automatically stop the vehicle in response to the urgent information being the urgent disaster report issued by the earthquake tsunami warning system, and determining a longer time taken to automatically stop the vehicle in response to the urgent information being the approaching urgent vehicle information.

6. The automatic stop device according to claim 1, wherein the stop time determiner determines the time taken to automatically stop the vehicle subsequent to the degree of urgency about the urgent information being determined by the urgency determiner.

7. The automatic stop device according to claim 1, wherein the information distribution apparatus is a base station.

* * * * *